US010583472B2

(12) United States Patent
Noland

(10) Patent No.: US 10,583,472 B2
(45) Date of Patent: Mar. 10, 2020

(54) BIOREMEDIATION COMPOSITION WITH A TIME RELEASE MATERIAL FOR REMOVING HYDROCARBONS FROM CONTAMINATED ENVIRONMENTS

(71) Applicant: REMEDIATION PRODUCTS, INC., Golden, CO (US)

(72) Inventor: Scott Noland, Arvada, CO (US)

(73) Assignee: REMEDIATION PRODUCTS, INC., Golden, CO (US)

( * ) Notice: Subject to any disclaimer, the term of this patent is extended or adjusted under 35 U.S.C. 154(b) by 465 days.

(21) Appl. No.: 15/159,274

(22) Filed: May 19, 2016

(65) Prior Publication Data

US 2017/0333962 A1  Nov. 23, 2017

(51) Int. Cl.
| | |
|---|---|
| *B09C 1/10* | (2006.01) |
| *B09C 1/00* | (2006.01) |
| *B01J 20/20* | (2006.01) |
| *B01J 20/28* | (2006.01) |
| *B09C 1/08* | (2006.01) |
| *C02F 3/34* | (2006.01) |
| *C02F 101/32* | (2006.01) |
| *C02F 101/36* | (2006.01) |
| *C02F 1/28* | (2006.01) |
| *C02F 3/00* | (2006.01) |
| *C02F 101/34* | (2006.01) |
| *C02F 103/06* | (2006.01) |

(52) U.S. Cl.
CPC .............. *B09C 1/10* (2013.01); *B01J 20/20* (2013.01); *B01J 20/28064* (2013.01); *B09C 1/002* (2013.01); *B09C 1/08* (2013.01); *C02F 3/341* (2013.01); *B09C 2101/00* (2013.01); *C02F 1/283* (2013.01); *C02F 3/348* (2013.01); *C02F 2003/003* (2013.01); *C02F 2101/32* (2013.01); *C02F 2101/34* (2013.01); *C02F 2101/36* (2013.01); *C02F 2103/06* (2013.01); *C02F 2305/06* (2013.01)

(58) Field of Classification Search
CPC .............. B01J 20/20; B01J 20/28064; B01J 20/28066; B01J 21/18; B01J 23/745; B01J 35/1023; B01J 35/1028; B09C 1/10; B09C 2101/00; B09C 1/002; C02F 2101/32; C02F 2101/36; C02F 2103/06; C02F 2305/06; C02F 1/58; C02F 2101/101; C02F 3/104; C02F 3/2806; C02F 3/34; C02F 2003/003; C02F 3/341; C02F 3/348
USPC ............... 435/252.1, 262.5; 502/1
IPC ........... B01J 21/18,23/745, 35/10; B09C 1/10, 1/00; C02F 3/34, 103/06, 1/58, 3/00, 3/28
See application file for complete search history.

(56) References Cited

U.S. PATENT DOCUMENTS

| | | | |
|---|---|---|---|
| 3,803,033 A | 4/1974 | Sutherland | |
| 3,846,290 A * | 11/1974 | Raymond | ........... C02F 3/02 166/246 |
| 4,478,954 A | 10/1984 | Connolly | |
| 4,713,343 A | 12/1987 | Wilson et al. | |
| 5,057,227 A | 10/1991 | Cohen | |
| 5,266,213 A | 11/1993 | Gillham | |
| 5,340,376 A | 8/1994 | Cunningham | |
| 5,403,809 A | 4/1995 | Miller | |
| 5,411,664 A | 5/1995 | Seech | |
| 5,427,944 A | 6/1995 | Lee et al. | |
| 5,436,211 A | 7/1995 | Erbel | |
| 5,480,579 A | 1/1996 | Seech et al. | |
| 5,534,154 A | 7/1996 | Gillham | |
| 5,618,427 A | 4/1997 | Seech et al. | |
| 5,733,067 A | 3/1998 | Hunt et al. | |
| 5,750,036 A | 5/1998 | Sivavec | |
| 5,753,122 A | 5/1998 | Taylor et al. | |
| 5,833,855 A | 11/1998 | Saunders | |
| 6,008,028 A | 12/1999 | Bender et al. | |

(Continued)

FOREIGN PATENT DOCUMENTS

| | | |
|---|---|---|
| CN | 105170644 A | 12/2015 |
| EP | 0646642 A2 | 5/1995 |
| WO | 9529129 | 11/1995 |

OTHER PUBLICATIONS

Ehrhardt, H. M., et al., "Phenol degradation by Microorganisms Adsorbed on activated carbon" Appl. Microbiol. Biotechnol (1985) 21:32-36.

Sakakibara, Yutaka, et al., "Biobarrier Comprised of Soil and BAC: Suppression of Greenhouse Gases" Activated Carbon and Other Support Media Used for Biobarriers, 113-118, The Sixth International in Situ and on-site Bioremediation Symposium: San Diego, CA 2001, ISBN: 9781574771107.

(Continued)

*Primary Examiner* — Blaine Lankford
(74) *Attorney, Agent, or Firm* — Snell & Wilmer L.L.P.; Kent A. Lembke

(57) ABSTRACT

A composition for use in remediation of soil and groundwater containing hydrocarbons and halogenated compounds. The remediation composition includes: (a) a first bioremediation material including a first blend of organisms capable of degrading the hydrocarbons; (b) a second bioremediation material including a second blend of organisms differing from the first blend of organisms that is chosen for degrading the halogenated compounds; (c) an organic compound such as a complex carbohydrate (e.g., food grade starch); and (d) a third blend of organisms capable of degrading the organic compound. The degrading of the organic compound by the third blend of organisms breaks the complex carbohydrate into smaller molecules that are utilized by the microorganisms of at least one of the first and second bioremediation materials during the degrading of the hydrocarbons and the halogenated compounds. The first bioremediation composition typically includes activated carbon capable of adsorbing the hydrocarbons and the halogenated compounds.

35 Claims, No Drawings

(56) References Cited

U.S. PATENT DOCUMENTS

| | | | |
|---|---|---|---|
| 6,083,394 | A | 7/2000 | Seech et al. |
| 6,242,663 | B1 | 6/2001 | Ponder et al. |
| 6,337,019 | B1 | 1/2002 | Razavi-Shirazi |
| 6,783,678 | B2 | 8/2004 | Sorenson |
| 6,787,034 | B2 | 9/2004 | Noland et al. |
| 7,045,339 | B2 | 5/2006 | Sorenson et al. |
| 7,129,388 | B2 | 10/2006 | Scalzi et al. |
| 7,141,170 | B2 | 11/2006 | Sorenson |
| 7,449,114 | B2 | 11/2008 | Sorenson |
| 7,531,709 | B2 | 5/2009 | Scalzi et al. |
| 8,097,559 | B2 | 1/2012 | Noland et al. |
| 2002/0015991 | A1 | 2/2002 | Brennan et al. |
| 2002/0090697 | A1 | 7/2002 | Hince |
| 2004/0007524 | A1 | 1/2004 | Noland et al. |
| 2004/0195176 | A1 | 10/2004 | Sorenson |
| 2005/0006306 | A1 | 1/2005 | Noland et al. |
| 2013/0295650 | A1 | 11/2013 | O'Driscoll et al. |

OTHER PUBLICATIONS

Tiehm, A., et al., Biological Activated Carbon Barriers for the Removal of Chloroorganics/BTEX Mixtures; Activated Carbon and Other Support Media Used for Biobarriers, Sixth International In Situ and on Site Bioremediation Symposium; San Diego, CA, Jun. 7, 2001., p. 105-112.

Communication pursuant to Rule 114(2) EPC; for the Examining Division; Applicant Remediation Products, Inc., Appl. No. 03764339.2-2104/1521723; dated Mar. 29, 2010, European Patent Office.

Jones, Valiant K., et al., Effects of Crystallite Size and Support on the CO Hydrogenation Activity/Selectivity Properties of Fe/Carbon; Journal Phys. Chem., 1986, 90, 4832-4839.

Leng, C. C., et al., "Effects of Surface Properties of Activated Carbons on Adsorption Behavior of Selected Aromatics," Carbon vol. 35, No. 9, 1997, pp. 1375-1385.

Martin-Martinez, Jose M., et al., "Carbon-Supported Iron Catalysts: Influence of Support Porosity and Preparation techniques on Crystallite Size and Catalytic Behavior," Ind. Eng. Chem. Res. 1991, 30, 2263-2275.

Wang, Chuan-Bao, et al., "Synthesizing Nonoscale Iron Particles for Rapid and Complete Dechlorination of TCE and PCBs," Environmental Science & Technology, vol. 31, No. 7, 1997, 2154-2156.

Elliott, Daniel W., et al., "Field Assessment of Nanoscale Bimetallic Particles for Groundwater Treatment," Environmental Science & Technology, vol. 35, No. 24, 2001, 4922-4926.

Ponder, Sherman M., et al., "Surface chemistry and Electrochemistry of Supported Zerovalent Iron Nanoparticles in the Remediation of Aqueous Metal Contaminants," Chemical Mater. 2001, 13, 479-486.

Pinna, Francesco, "Supported Metal Catalysts Preparation," Catalysis Today 41 (1998) 129-137.

Hegenberger, E., et al., "Evidence of Strong Interaction betwen Iron Particles and an Activated Carbon Support," Jounal Phys. Chem., 1987, 91, 5067-5071.

Oliveira, et al., Activated Carbon/iron oxide magnetic Composites for the adsorption of contaminats in water. Carbon 40 (2002) 2177-2183.

Muftikian et al., A method for the rapid dechlorination of low molecular weight chlorinated hydrocarbons in water. Wat. Res. vol. 29. No. 10 (1995) 2434-2439.

*Remediation Products, Inc.*, v. *Adventus Americas, Inc., et al.*, Adventus Americas, Inc. and Environmental Technologies, Inc., "Opposition to Plaintiffs Motion for Partial Summary Judgment," in the United States District Court for the Western District of North Carolina, Charlotte Division, Civil Action No. 3:07CV00153, filed May 19, 2008.

*Remediation Products, Inc.* v. *Adventus Americas, Inc., et al.*, In the U.S.D.C. Western District of NC, Civil Action No. 3:07CV00153, Memorandum In Opposition to Plaintiff's Motion for Partial Summary Judgment on U.S. Pat. No. 5,534,154, Document 162, Filed Jul. 2, 2009.

Millerick, et al, Electron Shuttle-Mediated Biotransformation of Hexahydro-1,3,5-trinitro-1,3,5-triazine Adsorbed to Granular Activated Carbon, Environ. Sci. Technol. 2013, 47, 8743-8750.

International Search Report for PCT/US17/30853, dated Jul. 21, 2017.

EP Search Report, EP Application No. 17799857.2, dated May 2, 2019.

\* cited by examiner

BIOREMEDIATION COMPOSITION WITH A TIME RELEASE MATERIAL FOR REMOVING HYDROCARBONS FROM CONTAMINATED ENVIRONMENTS

BACKGROUND OF THE DESCRIPTION

1. Field of the Description

The present invention relates to compositions and methods for in situ remediation (e.g., bioremediation) of contaminated environments, and particularly to the remediation of soil and/or groundwater contaminated with hydrocarbons.

2. Description of the Related Art

With increased concerns over protecting the environment and public health and safety, the identification and removal of contaminant materials in the environment, and especially from the groundwater supply, has become one of the most important environmental concerns today. Years of unregulated dumping of hazardous materials have severely contaminated the groundwater in many areas, creating significant health concerns and causing extensive damage to the local ecosystem. As a result, in recent years significant emphasis has been placed upon the clean-up and remediation of contaminated groundwater and the environment surrounding dump sites, which has lead to the creation of a new industry of environmental clean-up and remediation. However, conventional technologies currently being used for remediation for contaminated sites often are very expensive, can require years to perform, and are not always effective.

Because of the widespread use of both chlorinated solvents and petroleum hydrocarbons, contaminated ground water has been found in many sites around the world. Chlorinated solvents, such as trichloroethane (TCE) and perchloroethylene (PCE), are used for such purposes as dry cleaning, and as degreasers and cleaners in a variety of industries. Petroleum hydrocarbons commonly found in ground water include the components of gasoline, such as benzene, toluene, ethylbenzene, and xylene. Another common contaminant of ground water includes naphthalene. Additional groundwater and soil contaminants comprise polycyclic aromatic hydrocarbons (PAHs) created from combustion, coal coking, petroleum refining and wood-treating operations; and polychlorinated biphenyls (PCBs), once widely used in electrical transformers and capacitors and for a variety of other industrial purposes, pesticides, and herbicides.

Various ex situ and in situ methods have been utilized for the treatment, remediation, and disposal of contaminated soil. Ex situ methods generally include permanent removal of the contaminated soil to a secure landfill, incineration, indirect thermal treatment, aeration, and venting. Removal of contaminated soil to landfills is no longer an attractive alternative because of the high excavation, transportation, and disposal costs and also because of the potential for residual liability. Incineration and indirect thermal treatment can be achieved either on-site or off-site but, in either case, involves excavation, handling, and treatment of substantially all of the contaminated soil as well as significant amounts of soil adjacent to the contaminated soil. The soil must then either be transported to the treatment facility or else the treatment apparatus must be installed on-site. Other elaborate and expensive techniques that have been utilized involve excavation and treatment of the contaminated soil using multistep unit operations for separating and recovering the soil from the contaminants.

Additional existing clean-up methods and technologies include "pump and treat" methods in which contaminated groundwater is pumped to the surface, cleaned chemically or by passing the groundwater through a bioreactor, and then reinjected into the groundwater. Such a process generally is carried out over a long period of time, typically one to ten years or more. A common remediation treatment for ground water contaminated with chlorinated hydrocarbons involves pumping the water out of the well or aquifer, volatizing the contaminants in an air stripping tower, and returning the decontaminated water to the ground site. A related type of environmental remediation is the "dig and haul" method in which contaminated soils are removed and then treated or land filled.

The biggest problem with pump and treat systems is that, over time, they become more and more inefficient, so that stable residual concentrations become established. When this happens, the system is said to be "flat-lined" and very little further benefit is obtained. In addition, channeling often occurs so that large pockets of contamination are left behind, and rebound frequently occurs after the pumps are turned off.

A wide variety of materials and methods have been evaluated for in situ remediation of chlorinated hydrocarbons, including zero valent iron (ZVI), potassium permanganate, and hydrogen peroxide. ZVI renders the chlorinated hydrocarbon less toxic by reductive dehalogenation, i.e., by replacement of chlorine substituents with hydrogen. In this method, reactive walls are constructed by digging a trench across the plume migration path and filling it with iron filings. Sheet piling or some other means of directing the flow of groundwater is used to direct contaminated groundwater through the filing wall. The chlorinated hydrocarbons react with the elemental iron as the groundwater flows through the wall, and ideally, clean water emerges on the down gradient side of the wall. The disadvantage of the wall method lies in the difficulty of introducing large volumes of solid reactive material, such as iron particles, at effective depths. Conventional excavation methods generally limit the practical working depth to about 30 feet, whereas ground water contaminants are found at depths as great as 300 feet. Also, there may be a reduced permeability in the wall over time due to precipitation and plugging. Further, the reactive wall approach may not be useful in degrading methylene chloride and may be very slow, e.g., taking up to ten or more years to achieve any substantial remediation.

Oxygen release materials (ORMs) are compositions such as intercalated magnesium peroxide that release oxygen slowly and facilitate the aerobic degradation of hydrocarbon contaminants in situ. ORM's are most effective when used to polish up after a mechanical system has flat-lined and are least effective at new sites where no other remedial measures had been implemented. They are disadvantaged in that ORMs are expensive, and large amounts are required for complete oxidation. Additionally, multiple treatments are often required in order to achieve targeted cleanup goals, and up to five years may be needed to complete the process.

Hydrogen Release Compound® (HRC) is an alternative option for the in situ remediation of chlorinated hydrocarbons under anaerobic conditions via reductive dehalogenation. When in contact with subsurface moisture, HRC® is hydrolyzed, slowly releasing lactic acid. Indigenous anaerobic microbes (such as acetogens) metabolize the lactic acid producing consistent low concentrations of dissolved hydrogen. The resulting hydrogen is then used by other subsurface microbes (reductive dehalogenators) to strip the solvent molecules of their chlorine atoms and allow for further biological degradation. HRC® is injected into the affected environment under pressure and each treatment lasts for roughly six to nine months. Like ORMs, HRC® is expensive, and large amounts are required for complete degradation. Additionally, multiple treatments are always required in order to achieve targeted cleanup goals, and up to five years may be needed to complete the process.

Another emerging clean-up technology is "bioremediation," in which natural or genetically engineered microorganisms are applied to contaminated sites such as groundwater, soils or rocks. In this technique, specialized strains of bacteria are developed that metabolize various hydrocarbons such as gasoline, crude oil, or other hydrocarbon-based contaminates and gradually reduce them to carbon dioxide and water. However, such bacterial remediation requires that the bacteria and the hydrocarbon be brought into intimate contact under conditions in which the bacteria will act to metabolize the hydrocarbons. This requires extensive labor and effort to spread the bacteria on the soil and then to continually work and rework the contaminated area, turning and tilling the soil, until such time as the bacteria have been brought substantially into contact with all of the contaminated hydrocarbon particles. An additional drawback has been the ineffective spreading of injected bacteria due to clogging around the wells due to adsorption and growth of the bacteria about the wells.

The above-described technologies share one or more of the following drawbacks: (1) long periods of time are required for sustained reduction in contaminant concentrations to be realized; (2) although reductions can be realized, regulatory cleanup standards or goals for soil and groundwater are seldom attained; (3) performance is inconsistent and highly dependent on site conditions and contaminant levels; (4) with respect to active systems, contaminants are often removed from one formation (groundwater for example) and then released into another, such as air, and as a result, contaminants are not destroyed, just moved from one place to another; and (5) with respect to passive systems for treatment of chlorinated solvents, by-products are often released that are more toxic than the original contaminants, creating a transient condition more egregious than what existed before treatment.

Hence, a need remains for remediation processes to effectively clean up soil and/or groundwater contaminated with hydrocarbons that is rapid, cost effective, and does not release toxic by-products into the soil, air, or groundwater.

SUMMARY

The present description provides compositions and methods for in situ soil and/or groundwater remediation that can reduce contaminant concentrations quickly to regulatory cleanup standards. The compositions and methods work in a variety of soil and groundwater conditions and are applicable for the remediation of a variety of contaminants. The methods and compositions of this description do not release toxic by-products into the soil, groundwater, or air and have no impact on soil properties or groundwater quality. The compositions of this description are also cost effective in that they remain active for an extended period of time so that only a single treatment is required.

In prior work, the inventor created a bioremediation composition which, when added to water and/or soil contaminated with petroleum or other hydrocarbons, adsorbs hydrocarbons from the soil and/or water and degrades the hydrocarbons. More specifically, the original bioremediation composition included an adsorbent (e.g., activated carbon) capable of adsorbing the hydrocarbons. The composition further included a mixture of facultative anaerobes capable of metabolizing the hydrocarbons under sulfate-reduction conditions, a sulfate-containing compound that released sulfate over a period of time, and a nutrient system for promoting growth of the anaerobes. In some embodiments of the original bioremediation composition, the nutrient system included a sulfide scavenging agent.

In regard to the present description, though, the inventor further recognized there may be a useful synergy between this original or first bioremediation composition and other bioremediation technologies to degrade a longer list of contaminants that may be found at a contaminated site. Particularly, it was understood that successful degradation of hydrocarbons or other contaminants (such as halogenated compounds) is often mainly about achieving successful electron transfer. To this end, the original or first bioremediation composition, which is well suited for degrading hydrocarbons, may be used with a second bioremediation composition made up of a blend of organisms that are chosen for their ability to degrade chlorinated solvents and other halogenated compounds. For example, the first bioremediation composition may act to absorb the contaminants within the pores of the activated carbon and its blend or set of organisms may act in conjunction with the blend of organisms in the second bioremediation composition to degrade the contaminants.

Further, though, the inventor recognized that it is desirable to "feed" or "fuel" the organisms of the first and second bioremediation compositions to continue to degrade the contaminants over a longer period of time. Prior substrates used for this purpose often were ineffective as they donate hydrogen or the like very quickly and do not continue to be effective in feeding or fueling the first blend of organisms over time (e.g., over 20 to 40 days or more (such as up to 365 or more days)).

To this end, the inventor discovered that it would be useful to provide a combination of an organic compound (or polymeric substance or polymer), such as a complex carbohydrate to fuel/feed the blend of organisms of the first and second bioremediation compositions, and another (or third) blend of organisms whose sole purpose/function is to break the organic compound(s) into smaller molecules that are more readily utilized by the microorganisms of the first and second blends to support degradation of the contaminants. In this way, the fuel or smaller molecules from substrate or organic compound(s) are made available in a time released manner (e.g., the organic compound with the organisms (third blend) acts as a time release material) that facilitates the degradation of the contaminants over a much longer period of time so as to achieve greater percentages of degradation (e.g., 64 to 86 percent degradation achieved in some bench trials). In particular implementations, the organic compound is a complex carbohydrate that is (or includes) starch (such as food grade starch from a source such as corn, rice, wheat, or the like) while other exemplary, but not limiting, implementations utilize chitin.

More particularly, a bioremediation composition is provided that is particularly well suited for remediation of soil, wastewater, or groundwater containing both hydrocarbons and halogenated compounds (such as halogenated fuels, chlorinated solvents, and the like). The remediation composition includes: (1) a first bioremediation material (or composition) including at least one organism (and, typically, a blend of many microorganisms) capable of degrading the hydrocarbons; (2) a second bioremediation material (or composition) including at least one other organism (and, typically, a blend of many microorganisms) differing from the organism (or first blend of microorganisms) of the first bioremediation material and being capable of degrading the halogenated compounds (if present); (3) an organic compound or polymeric substance (or polymer) such as a polysaccharide (e.g., a complex carbohydrate (such as a food grade starch); and (4) a third material with one or more organisms (e.g., a blend of organisms) capable of degrading the organic compound. The bioremediation composition is a "time release material" because degrading of the organic compound or polymeric substance (e.g., a complex carbohydrate such as starch, chitin, or the like) by the organisms of the material/composition providing the third blend of microorganisms is performed over a time period of at least 20 days such as over 365 or more days (e.g., the time release functionality may extend over one to three or more years in some cases).

In some useful embodiments, the organic compound includes a complex carbohydrate in the form of a starch (e.g., a food grade starch such as corn, wheat, rice, tapioca, potato (including sweet potato), sago, mung bean, or arrowroot starch or a blend of such starches) while other remediation compositions utilize chitin. In practice, degrading of the organic compound or polymeric substance by the at least one organism in the remediation material or the third blend of organisms includes breaking the organic compound into a plurality of smaller molecules utilized (e.g., as electron donors) by the at least one organism of the first and second bioremediation materials during the degrading of the hydrocarbons and the halogenated compounds. In such embodiments, the degrading of the organic compound by the third blend of organisms (or at least one microorganism may be provided in the "blend") is performed over a time period of at least 20 days such as up to or exceeding 365 days (e.g., with testing showing ongoing degradation at 30 days or more). In some preferred embodiments, the first bioremediation composition includes activated carbon capable of adsorbing the hydrocarbons and the halogenated compounds, and the activated carbon has a surface area between about 800 and 2000 $m^2/g$.

In some practical implementations of the new bioremediation composition, the first bioremediation composition further includes an adsorbent capable of adsorbing hydrocarbons and a compound that releases sulfate over a period of time. Also, the first blend of organisms includes a nutrient system for promoting growth of facultative anaerobes capable of metabolizing the hydrocarbons. The adsorbent may be activated carbon, and the sulfate-containing compound may include calcium sulfate. Further, it may be useful for the nutrient system to include a sulfide scavenging agent. In such cases, the sulfide scavenging agent can be or include iron sulfate. Further, in some cases, the nutrient system includes a nitrogen source and a phosphorous source. In such cases, the nitrogen source may be an ammonium salt, and the phosphorous source may be or include a monobasic alkali-metal phosphate. In some particular implementations, the nitrogen source comprises ammonia and ammonium nitrate in a molar ratio of about 2.3 to 1.

DETAILED DESCRIPTION

Briefly, the following describes a remediation composition (or new bioremediation composition) that is particularly well suited to provide biological degradation of aromatic and other hydrocarbons. Natural attenuation of petroleum hydrocarbon groundwater plumes has been an accepted means for managing such contaminated sites for a number of years. Microorganisms able to mineralize these contaminants are naturally occurring and wide spread. Both aerobic and anaerobic pathways have been shown to degrade these compounds and a wide range of electron acceptors are known that participate in these processes. Aerobically, oxygen is one of the most effective electron acceptors and many technologies in common use today for remediation of petroleum hydrocarbon contaminated sites employ this pathway. Anaerobically, various metals including iron and manganese, and anions like sulfate or nitrate, are electron acceptors in the ultimate oxidation of these compounds. The one thing shared by all of these mechanisms is that the hydrocarbon contaminant is the electron donor in the process.

In the world of halogenated organic compound biodegradation of aromatic, aliphatic, and olefinic halogenated compounds, principal pathways for their destruction involve their being an electron acceptor. There are exceptions to this; however, the more commonly employed pathways take advantage of supplemental carbon-source amendments that are electron donors in the process and the halogenated compound is the acceptor. The environmental industry has focused on adding extra nitrate or sulfate to address petroleum hydrocarbons in the hope that key toxic hydrocarbons like benzene could be completely mineralized by maintaining a constant concentration of nitrate or sulfate. Research by the inventor teaches away from this idea. Further, there are many sites where sulfate levels of over 1000 ppm exist, but no significant biological degradation of petroleum hydrocarbons is taking place in spite of the fact that groundwater conditions should be very supportive of biological growth.

The remediation composition described herein goes against conventional wisdom in that a set of conditions has been discovered whereby hydrocarbons are the electron acceptors in a process that appears to accelerate and catalyze the overall rate of degradation of these hydrocarbons on an activated carbon platform. The activated carbon (in the first bioremediation material, for example) is likely an important part of this process as it is a conductor and can effectively shuttle electrons throughout the carbon particle. Taking electrons from any donor and transporting them to any and all electron acceptors regardless of whether they are inorganic like nitrate or a carbon-source hydrocarbon substrate. Another useful aspect of the currently described new remediation composition is the use of a time-release carbon-source substrate for use in the degradation of petroleum hydrocarbons. Experimental work has shown that food grade starch is an effective material for this purpose. If microorganisms that are suited to the degradation of this complex carbohydrate are added, then degradation of the starch results in a time release supply of small molecules (in this case sugars). These byproducts of degrading starch were discovered to enhance the degradation of petroleum hydrocarbons.

Activated carbon is well known to absorb a wide range of organic compounds. Charged species such as nitrate are not absorbed to any significant extent. Standard pathways for degradation of petroleum hydrocarbons involved the transfer of electrons from the hydrocarbon to an acceptor like nitrate. Given that these inorganic electron acceptors are not effectively absorbed by the carbon, the electrical connection provided between the carbon and the absorbed hydrocarbon could not be exploited to the fullest extent. With the addition of a complex carbon-source material (or "organic compound" as labeled herein) like starch along with microorganisms that will degrade it, a source of simple compounds readily absorbed by the activated carbon becomes available. Now, an efficient electrical connection exists between all carbon-source compounds acting as electron donors and acceptors enabling this transfer and enhancing the degradation of absorbed toxins.

The bioremediation composition described may be thought of as having several desirable features or ingredients. First, the bioremediation composition includes an absorbent capable of shuttling electrons and absorbing organic contaminants (e.g., activated carbon that may be provided in a first bioremediation material or first ingredient of the new bioremediation composition). Second, the new composition includes a complex organic material or compound capable of being biologically degraded to produce simple organic compounds that can be beneficially used as electron donors and/or acceptors to assist with the degradation of toxic contaminants. Third, the new composition includes microorganisms capable of degrading the complex organic material to produce simple organic compounds. Fourth, the new composition includes microorganisms capable of degrading petroleum hydrocarbons. Such microorganisms are naturally occurring and widely distributed but it can be beneficial to supplement with cultured organisms. Fifth, if halogenated organic compounds are also present, then microorganisms capable of degrading these compounds are preferably included in the new bioremediation composition.

Of all the materials tested for use as the organic compound of the bioremediation composition, starch produced the best overall results. Food grade starch is readily available and inexpensive. Starch is slightly soluble in water and is readily fermented by a range of non-pathogenic organisms. For these reasons, starch is the preferred substrate for use in the described system. Other naturally occurring or manmade complex materials and polymers that can be biologically degraded producing small molecules are expected to also be effective.

The following description relates to new bioremediation compositions and methods for in situ remediation of environments such as soil or groundwater contaminated with hydrocarbons and other contaminants such as halogenated hydrocarbons. The description builds upon prior discoveries made by the inventor of a bioremediation composition that combined activated carbon with a blend of organisms (or a first bioremediation material) that is particularly well suited for cleaning up soil and groundwater contaminated with hydrocarbons. The effectiveness of this first bioremediation composition, with an adsorbent such as activated carbon, is significantly enhanced, though, by combining it with other bioremediation technologies (e.g., a second bioremediation material with another set or blend of one-to-many microorganisms) suited for degrading the same or other contaminants such as halogenated hydrocarbons to create a new bioremediation composition (or, more simply, new remediation material or composition).

Further, the effectiveness of the first and second bioremediation technologies is increased by including in the new bioremediation composition a combination of a time release material (or organic compound or polymeric substance such as a complex carbohydrate (e.g., starch, chitin, or the like)) with another (or third) set or blend of one or more microorganisms chosen for its ability to break up or degrade the time release material (e.g., a complex carbohydrate) into smaller molecules for better utilization over time by the set or blend of microorganisms in the first bioremediation material and/or in the second bioremediation material.

Stated differently, the first and second bioremediation materials (which include the adsorbent that may be in the form of granular activated carbon) combined with the organic compound(s) or polymeric substance(s) (e.g., a starch or other complex carbohydrate) and microorganisms (e.g., the third blend of one or more organisms) degrading the organic compounds/polymeric substances provide a time release composition that acts to enhance and support (e.g., fuel) the degradation over a relatively long time period (e.g., 20 to 365 days or longer). This time release platform is used (as it slowly releases hydrogen or the like) in the new bioremediation composition described herein by the sets or blends of microorganisms included that degrade the contaminants such as hydrocarbons and halogenated compounds.

With regard to "the time release material" to be used, the inventor understood that polymers are large molecules formed when monomers link together to form the larger molecule. The monomer can be a simple compound like ethylene ($CH_2CH_2$) or a more complex substance or material such as a sugar. In general, polymers have the following structure: [repeating unit]n, where the repeating unit is a monomer and n is the degree of polymerization. With respect to degradation of hydrocarbons and halogenated organic compounds, many simple substances have been used to promote such degradation. However, they are typically very short lived and include sugars and fatty acids like lactic acid. As previously described, these simple substances or compounds are water soluble and readily consumed by a variety of microorganisms.

Hence, the inventor recognized the need for a time release material that would be a source of such compounds that play the role of a substrate that can be beneficially used by organisms capable of degrading contaminants, e.g., hydrocarbons, halogenated compounds, and the like. Specifically, the inventor discovered that organic compounds or polymeric substances (or polymers) were good sources of such time released materials. Naturally occurring polymers may be preferred in some applications, but manmade polymers may also be used to practice remediation products/processes of the present description.

Naturally occurring polymers fall into three general types or categories: (1) polynucleotides; (2) polyamides; and (3) polysaccharides. Of these, the inventor discovered that polyamides and polysaccharides are likely the most applicable and useful. In some specific embodiments, one of the more effective polymeric substances or organic compounds presented in this description is complex carbohydrates such as one or more starches (which are polysaccharides). Polymers contain monomeric units that can fulfill the role of a time release material, which is beneficially used to support degradation of halogenated compounds and/or other contaminants. Polymeric fatty acids such as polylactic acid and polymers of amino acids (polyamides) are additional examples of organic compounds or polymeric substances that may be utilized. Short chains of amino acids with 6 to 30 acids linked together by peptide bonds are referred to as polypeptides. When the number of amino acids reaches 40 or more (molecular weight of 5000 Da (Daltons)), the chain takes on the properties associated with proteins. Examples of proteins that may be used in the remediation compositions include casein, yeast extract, and peptone.

In general, polymeric substances that can be used as part of the remediation compositions described and claimed herein include organic compounds, which typically will include monomeric units that can be used as a time release material supporting the degradation of halogenated organic compounds with average molecular weight exceeding 2500 Da or more preferably exceeding 5000 Da. Polysaccharides may alternatively be characterized according to the general formula $C_x(H_2O)_y$, where x is an integer greater than 12 and preferably where x is an integer between 200 and 2500 and further where x and y are different integers. Alternatively, polysaccharides may be characterized according to the general formula $(C_6H_{10}O_5)_n$, where n is an integer that, in one embodiment, is greater than or equal to 40 and less than or equal to 3000.

The following description provides specific examples of polymeric substances and/or organic compounds in the form of complex carbohydrates such as food grade starch. However, it will be understood by those skilled in the art that these are non-limiting examples and other organic compounds or polymeric substances may be substituted in these remediation compositions. The following description first discusses the first bioremediation material that is included in the new remediation composition and how it may be manufactured. The description provides a method of using the new bioremediation composition to decontaminate soil and/or groundwater. The description then proceeds to detail possible mixtures or "recipes" for providing or manufacturing the new bioremediation composition (e.g., a composition that combines the first bioremediation material with a second bioremediation material, an organic compound, and a material that provides one or more microorganisms for breaking up or degrading the organic compound slowly over a long time period (e.g., 20 to 365 or more days)).

More specifically, the new bioremediation composition may include a base or first bioremediation composition. The base or first bioremediation composition can be particularly designed for in situ bioremediation of environments contaminated with hydrocarbons. The vast majority of sites contaminated with fuel hydrocarbons are naturally in an anaerobic state. The base or first bioremediation material used in the new bioremediation composition of this description takes advantage of this condition and is designed to promote anaerobic oxidation of hydrocarbons through a sulfate-reduction mechanism. In addition, the base or first bioremediation material includes an adsorbent having an affinity for hydrocarbon contaminants, thereby providing a means for concentrating the contaminants and increasing the rate of bioremediation. The adsorbent can be chosen so as to be capable of adsorbing toxic intermediate bi-products produced by the reductive dehalogenation of the contaminants, e.g., intermediates such as dichloroethane and intermediate by-products of trichloroethane decomposition.

Accordingly, the base or first bioremediation composition of the new time release bioremediation composition is useful for in situ bioremediation of an environment contaminated with hydrocarbon. It may include an adsorbent capable of adsorbing hydrocarbons and may optionally include a mixture of two or more species of facultative anaerobes capable of metabolizing the hydrocarbons under sulfate-reduction conditions. This base or first bioremediation material may also include a sulfate-containing compound that releases sulfate ions over a period of time. It may further optionally include a nutrient system for metabolism of said facultative anaerobes, and this nutrient mixture or system may include a sulfide scavenging agent.

An illustrative example of the base or first bioremediation composition in the new bioremediation composition of this description may include a mixture of the ingredients listed in Table 1.

TABLE 1

| Ingredient | Composition (wt %) |
|---|---|
| Adsorbent | 51.3 to 77 |
| Micronutrients | 3.8 to 10.2 |
| Sulfate-containing compound | 19.2 to 38.5 |
| Mixture of facultative anaerobes | $1 \times 10^6$ CFU/gm-carbon |

The adsorbent provides a means for concentrating the mixture of facultative anaerobes at the site of contamination. In addition, the adsorbent provides an efficient matrix for adsorbing and, thus, concentrating the hydrocarbon contaminants. As a result, the rate of bioremediation is dramatically increased relative to rates obtained using conventional methods. In one embodiment, the adsorbent is activated carbon, which has a high affinity for hydrocarbons. In addition, activated carbon has an affinity for facultative anaerobes, which is advantageous for in situ bioremediation where growth of the microorganisms is desired. The adsorbent can be chosen and/or manufactured to have a high surface area per unit weight and a high affinity for halogenated hydrocarbons. Suitable adsorbents for purposes of this description include, but are not limited to, activated carbon, vermiculite, alumina, zeolites, and chars such as wood, bone, and the like. Thus, while the method of preparing the first bioremediation material is described utilizing activated carbon as the adsorbent, it is to be understood that the new remediation composition is not limited to only this adsorbent.

In one non-limiting embodiment, the adsorbent provided in the first bioremediation material of the new remediation composition is activated carbon. The activated carbon preferably has a high surface area per unit weight (preferably ranging from 800 to 2000 $m^2/g$) and a high affinity for halogenated hydrocarbons. The ability of activated carbon to adsorb organics from water enhances its utility as a support. However, while the activated carbon can trap hydrocarbon contaminants, carbon by itself is not stable over long periods, i.e., it is subject to erosion, in which case the contaminants move with the activated carbon and are not truly trapped and removed.

Activated carbons can be manufactured from a broad spectrum of material, including, but not limited to, coal, coconut shells, peat, and wood. The raw material is typically crushed, screened, and washed to remove mineral constituents. The material is then activated at high temperatures (typically over 900° C.) in a controlled atmosphere to produce a material having an extensive porous network and a large surface area (e.g., ranging from 1000 to 2000 $m^2/g$). The base or first bioremediation composition of this description may be produced with virtually any source of activated carbon. All that is needed are minor adjustments in system design parameters to account for the different forms of carbon. When the product is used for remediation of groundwater, acid-washed carbons may be useful since the acid wash removes any extraneous metals that may be of environmental concern from the carbon. With activated carbon, available surface areas for adsorption preferably range from about 800 $m^2/gm$ to 2000 $m^2/gm$.

The mixture of facultative anaerobes in some embodiments includes hydrocarbon degraders that metabolize the hydrocarbon contaminants under sulfate-reduction conditions. A facultative anaerobe is a microbe such as bacteria and fungi that can switch between aerobic and anaerobic types of metabolism. Under anaerobic conditions, they grow by fermentation or anaerobic respiration. Further, since oxygen is not toxic to facultative anaerobes, the facultative anaerobes used in the base or first composition (or first bioremediation material) of this description typically are chosen so that they are not sensitive to the low levels of oxygen frequently found at contaminated sites. In one embodiment, the mixture of facultative anaerobes includes symbiotic facultative anaerobes that work in concert with each other. That is, one type of facultative anaerobe will break down a hydrocarbon contaminant to a first intermediate, and another type of facultative anaerobe will break down the first intermediate to a second intermediate or final by-product and so on.

In one embodiment, the mixture of facultative anaerobes includes at least one anaerobe that is a sulfate-reducing bacteria. Generally, sulfate-reducing bacteria are distributed widely in nature where anoxic conditions prevail. For example, such bacteria have been found in sewage, polluted water, sediment of lakes, sea and marine muds, oil wells, and the like. In one embodiment, the composition of the present description is designed to dramatically increase the activity of naturally occurring sulfate-reducing bacteria by introducing cultured bacteria into the contaminated environment. Rather than depending on indigenous bacteria to inhabit the injected adsorbent, an aqueous suspension of the adsorbent is blended with the mixture of facultative anaerobes that includes bacteria specifically cultured for degradation of hydrocarbons. This mixture is stirred for a short period of time prior to injecting into the contaminated site to ensure all micronutrients have dissolved to provide a homogeneous mixture. In addition, this pre-mixing provides the cultured bacteria with an advantage over indigenous bacteria, maximizing the opportunity for the cultured bacteria to predominate. By not relying on indigenous bacteria to decompose the hydrocarbon contaminants, the base or first bioremediation compositions of this description provide a means for removing hydrocarbon contaminants in a much shorter time period.

Commercial cultured mixtures of facultative anaerobes vary over a considerable range, and the amount added will depend on the source and whether it is a dry, mineral-based product, or if it is a liquid concentrate. Regardless of the source, a sufficient amount of the facultative anaerobe mixture is added so that a targeted suspension concentration of 5 to 10 million CFU (colony forming units) per milliliter is obtained. In general, the cultured bacteria may be chosen to include multiple species or strains of bacteria. The species or strains of bacteria are advantageously derived from *Pseudomonas, Phenylobacterium, Stenotrophomonas, Gluconobacter, Agrobacterium, Vibrio, Acinetobacter*, or *Micrococcus*, yeasts or other genera can also be employed. Exemplary bacterial strains include *Pseudomonas pseudoalkaligenes, Phenylobacterium immobile, Stenotrophomonas maltophilia, Gluconobacter cerinus, Agrobacterium radiobacter* or *Pseudomonas alcaligenes*.

As discussed above, the first or base bioremediation material or composition of the new bioremediation composition of this description metabolizes hydrocarbon contaminants under sulfate-reduction conditions. Some or all of the facultative anaerobes reduce sulfate to hydrogen sulfide and metabolize (oxidize) at least some hydrocarbon contaminants in the process. Thus, decomposition of hydrocarbons under sulfate-reduction conditions requires a source of sulfate ions. Accordingly, the base or first bioremediation material or composition of this description may include a sulfate-containing compound. Preferably the sulfate-containing compound has a low water solubility and is non-toxic. An illustrative example of a suitable sulfate-containing compound is gypsum (calcium sulfate), which is a non-toxic, naturally occurring compound found in soil. Since gypsum has a low solubility in water, it breaks down over time to provide a slow release of sulfate ions. In this manner, a low but persistent level of sulfate can be maintained during bioremediation using a composition of this description. In this manner, gypsum acts as a "time released" source of sulfate ions, which is advantageous since the mixture of facultative anaerobes consumes the hydrocarbon contaminants over a period of time. As long as there is an adequate supply of dissolved sulfate, the activity of the facultative anaerobes will be optimized. Accordingly, any non-toxic sulfate-containing compound that releases sulfate ions in a manner similar to gypsum is suitable for purposes of this description. As used herein, "nontoxic" refers to standards set forth for drinking water standards as regulated by the United States Environmental Protection Agency and defined by the Occupational Health and Safety Administration.

Low levels of micronutrients, which are desirable to support growth of the cultured facultative anaerobes, may be mixed in with the other components of the base or first bioremediation composition in some embodiments of the new bioremediation composition. A suitable nutrient system for the facultative anaerobes includes a nitrogen source such as an ammonium salt and a phosphorus source such as an alkali metal phosphate compound. Preferably, the micronutrient source does not contain sand, gravel, fillers, or other insoluble products found in commercial fertilizers. One example of a suitable micronutrient source for purposes of this description contains nitrogen (e.g., 24 percent by weight as ammonia and ammonium nitrate in a ratio of about 2:1), phosphorus (e.g., 10 percent by weight as ammonium phosphate), potassium (e.g., 2 percent by weight as potassium chloride), sulfur (e.g., 5 percent by weight as ammonium sulfate), and iron (e.g., 2 percent by weight as ferrous sulfate). The nutrient system also includes a sulfide scavenging agent. In one embodiment, the sulfide scavenging agent is a ferrous iron salt such as iron sulfate. In another embodiment, microorganisms are added that oxidize sulfide to elemental sulfur. In this case, no sulfide scavenging agent is needed, and any sulfide produced is controlled biologically.

After injection into the contaminated soil or groundwater, the base or first bioremediation composition rapidly reduces concentrations of the hydrocarbon contaminants in the soil and/or the groundwater. Hydrocarbon contaminant molecules are adsorbed by the composition and are thus co-located together with the cultured microorganisms in the pores of the adsorbent matrix. The hydrocarbon contaminant concentration within the adsorbent matrix thus becomes substantially higher than that which existed in the soil or groundwater. As a result, rates of degradation are significantly faster than rates commonly observed using current technology. As adsorbed contaminants are degraded, active sites become available to adsorb fresh contaminants, and the cycle is repeated until the microcosm runs out of food (e.g., hydrocarbons).

By-products of sulfate reduction include carbon dioxide, water, a variety of fermentation products such as light alcohols (ethanol, propyl alcohol, isopropyl alcohol, butyl alcohol, and the like), and hydrogen sulfide. In a typical installation, elevated concentrations of hydrogen sulfide do not occur because a sulfide scavenging agent (e.g., iron sulfate) is incorporated as one of the micronutrients. For example, an iron salt can scavenge hydrogen sulfide and form insoluble iron sulfide, thus preventing toxic levels of hydrogen sulfide from accumulating. Thus, transient concentrations of hydrogen sulfide are maintained well below regulatory thresholds, protecting groundwater quality.

The mixture of facultative anaerobes included in the base or first bioremediation composition of the new bioremediation composition of this description is capable of biodegrading various aliphatic, aromatic, and polycyclic aromatic hydrocarbons. For example, the new bioremediation composition can be used to biodegrade aromatic hydrocarbons present in gasoline such as benzene, toluene, ethylbenzene, and xylenes. Examples of polycyclic aromatic hydrocarbons that can be biodegraded using the new bioremediation composition of this description generally include any of the various aromatic compounds containing multiple ring structures. Some of the most toxic (carcinogenic) aromatic hydrocarbons (polycyclic aromatics) are fairly resistant to bioremediation, requiring long periods of time for assimilation, but they are tightly held by activated carbon. Polycyclic aromatic hydrocarbons are generally present in and derived from fossil fuels, especially coal and petroleum. Relatively high concentrations of polycyclic aromatic hydrocarbons are found in coal-tar pitch, petroleum and coal-tar naphtha, and various other high-boiling point petroleum fractions, as well as various products derived therefrom including roofing pitch, sealants, road tars, asphalts, pipe coatings, water-proofing materials, dyes, pesticides, paint additives and wood preservatives. A single large spill of such materials containing high concentrations of polycyclic aromatic hydrocarbons can result in serious contamination requiring rapid remedial action. Additionally, various fuels, such as kerosene and gasoline, or other substances containing low concentrations of polycyclic aromatic hydrocarbons can have a cumulative effect. Potential applications of the description include soil bioremediation at manufactured gas plant sites, coke oven sites, petroleum refineries, fuel depots, gas stations, and other industrial sites.

As described, in the preparation of a new bioremediation composition of this description, the microorganisms and adsorbent are mixed with water for a short period of time prior to application to allow the microorganisms to inhabit the pores of the adsorbent matrix prior to injection into the contaminated environment. As a result, the "adsorbent microcosm" is pre-inhabited by large numbers of organisms tailored for rapid assimilation of fuel hydrocarbons, optimizing the opportunity of such anaerobes to dominate the "sulfate-reducing" niche over indigenous microbes.

The new bioremediation composition that includes the base or first bioremediation composition (along with a blend or set of one-to-many organisms of an additive or second bioremediation composition suited for degrading halogenated compounds, an organic compound (e.g., a complex carbohydrate), and a blend or set of organisms for degrading the organic compound (e.g., the complex carbohydrate)) can be applied to treatment of soil and water contaminated with a variety of water miscible or soluble halogenated organic compounds. Chlorinated solvents are particularly common contaminants in aquifers and other subsurface water-containing environments. Contaminants that may be effectively treated include halogenated solvents such as, but not limited to, (TCE), dichloroethylene (DCE), tetrachloroethylene, dichloroethane, trichloroethane, perchloroethene (PCE), vinyl chloride (VC), chloroethane, carbon tetrachloride, chloroform, dichloromethane and methyl chloride. Other classes of contaminants that may be effectively treated include brominated methanes, brominated ethanes, brominated ethenes, fluorochloromethanes, fluorochloroethanes, fluorochloroethenes, polychlorinated biphenyls (PCBs), and pesticides.

In this regard, the description provides a method of remediating a site contaminated with hydrocarbons. The method includes injecting a new bioremediation composition of this description into one or more locations of the contaminated site. Illustrative examples of contaminated environments that can be treated with a remediation composition of the first and second bioremediation compositions (along with an organic compound such as a starch or other complex carbohydrate and degrading organisms) include, but are not limited to, soil, sediment, sand, gravel, groundwater, aquifer material, and landfills. For example, in one embodiment, the new bioremediation composition is injected into multiple sites within an aquifer, as described in Example 1. In this embodiment, the application method results in a substantially homogeneous distribution of the new bioremediation composition in the contaminant plume, as opposed to creating a barrier or filled trench as in conventional methods. Thus, the remediation method according to the embodiment described in Example 1 using the new bioremediation composition does not rely on groundwater diffusion for effective treatment. Rather, the activated carbon component of the new bioremediation composition concentrates the contaminants within the adsorbent matrix, thereby increasing the rate of contaminant degradation.

The new bioremediation composition remains active for an extended period of time so that typically only a single treatment is required. This "time release" characteristic is effectively paired with the time release characteristics of the complex carbohydrate and blend or set of microorganisms provided in the remediation composition to degrade or break up the complex carbohydrate into smaller molecules to be utilized more effectively and over time (e.g., 20 to 365 days or more) by the blend of one-to-many organisms provided for assisting in degrading the contaminants including, in some applications, halogenated hydrocarbons. Further, the material is easy to use and does not require any special safety controls or equipment for installation.

The remediation composition and its use in remediating contaminated soil/groundwater is further illustrated by the following non-limiting examples. All scientific and technical terms have the meanings as understood by one with ordinary skill in the art. The specific examples which follow illustrate the methods in which the compositions of the present description may be prepared and are not to be construed as limiting the invention in sphere or scope. The methods may be adapted to variation in order to produce compositions embraced by this description but not specifically disclosed. Further, variations of the methods to produce and use the same compositions in somewhat different fashion will be evident to one skilled in the art.

EXAMPLE 1

Application of a Bioremediation Composition to Remediate Soil/Groundwater

Small diameter (e.g., about 0.75 to 2 inches in diameter) injection rods are driven to targeted depths (e.g., 5-150 feet). The depth will depend on the power of the drill rig and the hardness of the soil. Hydraulically powered direct-push drill rigs are used to pound/push the injection rod to the desired depths, and then withdraw it about 6 inches to open up a small void below the injection point. Alternatively, the injection rods can be configured with injection tips that allow injection without opening up a void below the rods. A premixed aqueous suspension of a remediation composition of this description is then injected under pressure down the rod. Pressure is allowed to build in the formation, and a slurry begins to flow out into the formation. No attempt is made to control the path of fluid flow, but, rather, the objective is to achieve a substantially homogeneous distribution of the suspension within the formation. The suspension tends to emanate outward in all directions from the base of the injection, and the average or effective radius of influence is controlled by the amount of fluid pumped into the rod.

After injection of the first batch of the suspension, a second (fresh) batch of the suspension can be prepared, a new injection rod installed, and the process repeated. Treatment in this fashion is continued throughout the plume, reducing concentrations of contaminants in the groundwater concentrations as treatment progresses. If one could view a cross-section of the formation, the treatment regime is intended to create a three-dimensional network of material, dispersed randomly and fairly uniformly throughout the treated formation.

Many treatment technologies, ZVI for example, only work well when installed in groundwater (saturated soils) and is not effective for treatment of vadose zone (unsaturated) soils. Because activated carbon is very effective at adsorbing organic compounds from vapor streams, the remediation compositions of this description are able to perform nearly as well when installed in the vadose zone. As a result, the remediation composition can be used equally well for treatment of contaminated soils and groundwater.

With this understanding of the base or first bioremediation composition and the use of the new bioremediation composition in mind, it may be appropriate at this point in the description to turn to formulas or recipes for the new bioremediation composition that builds upon the base or first bioremediation composition (e.g., activated carbon combined with a first blend or set of organisms for degrading a first set of contaminants that includes hydrocarbons). Particularly, the inventor experimented with a variety of new remediation compositions or materials that include the base or first bioremediation material to find a composition for providing degradation that is more complete and/or that covers a broader list of contaminants (e.g., the first set of target contaminants plus a second set of contaminants such as halogenated hydrocarbons chosen for this specific purpose). This enhanced performance is achieved, it is believed, by a combination of capturing or absorbing the contaminants in the pores of the activated carbon and then providing a hydrogen or electron source (or "fuel" source) for the bioremediation compositions that can be consumed over a longer period of time than was the case with prior substrates.

The new remediation composition can generally be thought of as including the following main ingredients or materials: (1) a first bioremediation material with activated carbon and a first blend of one or more organisms that functions to degrade a first target contaminant(s) such as hydrocarbons; (2) a second bioremediation material with a second blend of one or more organisms (that differ from those in the first blend) that functions to degrade a second target contaminant(s) (e.g., halogenated compounds such as fuel hydrocarbons, chlorinated solvents, and the like) (note, this "material" may be made up solely of the second blend of organisms without any additional components as found, typically, in the first bioremediation material in the form of the adsorbent); (3) an organic compound or polymeric substance (such as one or more polyamides and/or polysaccharides (e.g., one or more complex carbohydrates)); and (4) a third bioremediation composition or material (or, more simply, a third remediation material, which like the second bioremediation material may be made up solely of microorganisms without any other component) with a third blend of one or more organisms that functions to degrade the organic compound or polymeric substance. Ingredients (3) and (4) may be considered a new composition or platform (or act together to form a new platform) to facilitate bioremediation functionality of the first and second blends of one-to-many organisms.

As background to the origin of the remediation composition, it is useful to understand that the inventor was considering the use of the base or first bioremediation composition at sites contaminated with a broad mixture of contaminants. In one example of many tests completed over years, the site's groundwater was known to contain alcohols, aromatics, ketones, chlorinated solvents, ethers, and aliphatic compounds. The challenge in remediating such a site is that no single known technology can address all the contaminants of concern. Testing showed that total contamination of the groundwater was roughly 2,000 ppm or 0.2% (wt) of toxic organic compounds.

As a consequence of this range of contaminants and the propensity for generation of recalcitrant daughter products, most remedial strategies (prior to the new remediation composition) would likely include the use of multiple techniques implemented in series over a period of time. With these issues in mind, the inventor discovered a combination of technologies (i.e., a new bioremediation composition as labeled herein) that would work together in a new and improved manner so as to provide one treatment that can be used on sites like the example provided above to achieve targeted cleanup levels. The use of just a single bioremediation composition is highly desirable—but not in existence prior to the new bioremediation composition—as it would provide a substantial reduction in time, cost, and the field effort. As will become clear, the discovered bioremediation compositions taught herein may be utilized (such as in the method discussed in Example 1) in the field to successfully remediate a contaminated site (e.g., a site with contaminants including hydrocarbons and/or halogenated compounds).

In laboratory tests, trace metals were added to each test bottle of groundwater from the contaminated site along with the other ingredients of the remediation compositions. During an active remediation, though, there is typically no need to include trace metals to maintain good microbial growth as these are available from minerals in the subsurface and in groundwater. However, when only groundwater is utilized, some trace metals are needed. Also, micro and macro nutrients were added to the test vials or bottles to help create a very favorable environment for cell growth, but these nutrients typically are readily available in contaminated soils and groundwater (or in the base or first bioremediation composition in some embodiments) and do not generally need to be included in a remediation composition.

With regard to useful and desirable ingredients for the new bioremediation composition, the first ingredient in the "recipe" for the new bioremediation composition provided above is a bioremediation composition combining activated carbon with a first set or blend of microorganisms suited for degrading a first set of target contaminants including hydrocarbons. In some preferred embodiments, this composition takes the form of one of the base or first bioremediation compositions described herein and which can be manufactured as described above so as to provide granular activated carbon, for absorbing contaminants such as hydrocarbons and halogenated compounds within its many pores.

The second ingredient is a second or additive bioremediation composition (or compositions) providing a second blend of one-to-many organisms chosen specifically to degrade a second set of targeted contaminants. In some embodiments, these targeted contaminants are halogenated compounds including chlorinated solvents and the like. The inventor used or tested, for this second ingredient, three different bioremediation compositions that included three differing sets or blends of such microorganisms, and the results showed that it is highly likely that a wide variety of sets/blends will be useful in the new bioremediation composition, when combined with the other three ingredients, in effectively degrading halogenated compounds. One set or blend of one or more microorganisms is commercially available (e.g., from vendors as a liquid concentrate) and is a blend of many organisms that in the past had been demonstrated to degrade fuel hydrocarbons such as benzene, toluene, xylenes, and the like. The second tested set or blend of one or more microorganisms was a blend of organisms (again, commercially available as a liquid concentrate) that has proven (or is known) to be able to degrade chlorinated solvents and other halogenated compounds including chloroform cis-DCE (dichloroethylene), methylene chloride, TCE (trichloroethylene), VC (vinyl chloride), and chlorobenzene. The third tested set or blend of one or more microorganisms was a blend of dehalococcoides (DHC) that is also commercially available (e.g., distributed by SiREM of Canada as KB1®) and is designed to degrade various chlorinated compounds completely to hydrocarbon gases. Note, this second "ingredient" (which may be combined with the first or base bioremediation material) may include two or more vendor-provided compositions that are combined to degrade all the targeted contaminants of a particular site.

The third ingredient used in the making of the bioremediation composition is an organic compound or polymeric substance (such as a complex carbohydrate or other polysaccharide and/or a polyamide) while the fourth ingredient is a third set or blend of one or more microorganisms, which is selected due to its ability to degrade the organic compound or polymeric substance (e.g., degrade a particular complex carbohydrate such as a food grade starch). In one useful embodiment, this third set or blend of one or more microorganisms in the tests was known to be able to degrade a complex carbohydrate such as cellulose and starch to smaller compounds that can then be beneficially used by other organisms (e.g., those of the first and/or second sets or blends in the bioremediation composition) to degrade site contaminants (e.g., hydrocarbons and/or halogenated compounds such as chlorinated solvents). When other organic compounds or polymeric substance are used, it may be desirable to choose the third set or blend of one or more microorganisms for its ability to degrade that organic compound(s) or polymeric substance(s). These two ingredients may be thought of as providing a time release substrate for fueling degrading processes by the first and/or second sets or blends of the microorganisms at a site.

In performing the bench tests, the inventor performed testing with lactic acid (in the form of sodium lactate but without a second blend of organisms used to degrade the lactate). Lactate is commonly used for bioremediation of chlorinated solvents in combination with blends of DHCs and other organisms effective at degradation of such compounds. These tests showed or verified that a significant limitation of lactate as a substrate is that it is water soluble such that it tends to move with groundwater and is rapidly consumed such that it is ineffective for supporting degradation over longer periods of time (e.g., is not a "time release substrate"). As a result, in practice, remediation of sites with lactate requires that a number of supplemental doses be applied to maintain a persistent concentration supportive of the degradation pathways. This undesirably adds to the cost and field work efforts of the remediation of a contaminated site.

In the bench tests, the inventor discovered that it would be highly useful and desirable for the third and fourth ingredients of the new bioremediation composition to be chosen to provide materials that could be beneficially used and consumed by the one or more microorganisms over an extended time period (e.g., 20 to 365 days or longer). Particularly, it was discovered that organic compounds in the form of complex carbohydrates (e.g., food grade starch or chitin) are readily available and inexpensive and may provide the characteristics of a material useful in the substrate. It was recognized that, in contrast to lactate, many complex carbohydrates have low water solubility so that they are less likely to move with the groundwater than lactate. Further, the inventor recognized that the complex carbohydrates could be degraded or broken down over an extended period of time to provide a time release platform or composition for facilitating or supporting (during remediation processes) the first and/or second blends of one or more organisms in the new bioremediation composition.

Specifically, it was understood by the inventor that starch (e.g., a carbohydrate (or a polysaccharide) has a large number of sugar units joined by glycosidic bonds, and it may include two types of molecules in the form of linear and helical amylose and branched amylopectin, which may be provided in the form of food grade starch) has low water solubility and is easily degraded by a wide variety of organisms, which can be provided as the fourth ingredient of the new bioremediation composition. Similarly, chitin (e.g., another natural polysaccharide) was identified by the inventor as another potential material for the new bioremediation composition as it has low water solubility and has proven to be a useful substrate or composition for degradation of chlorinated solvents using one or more microorganisms.

Both the starch and chitin were believed to have the potential to be "time release" sources of smaller molecules that can be utilized by the microorganisms (of the first and/or second blends of organisms) to more effectively perform degradation (e.g., degradation of chlorinated organic compounds (COCs) over time without a need for addition of more substrate materials). This potential was shown in bench testing in which starch or chitin (the third ingredient of the remediation composition) was used along with a third blend of one or more organisms chosen for their ability to degrade complex biopolymers (such as the complex carbohydrates of starch, chitin, and the like) to provide a time releasing mechanism for the smaller molecules/compounds used as "fuel" for degradation processes by the organisms of the first and/or second blends of one-to-many organisms in the new bioremediation composition.

In the tests, the new bioremediation composition was added to bottles of the ground water as follows: (1) 1.5 or 2.0 grams nominal of the first or base bioremediation composition with the activated carbon and the first set or blend of organisms; (2) 1.0 or 1.5 ml quantities of the second or additive bioremediation composition with the second set or blend of organisms (or more sets/blends if two or more liquid concentrates from vendors was used to target different contaminants); (3) 0.5 grams of the complex carbohydrate (e.g., starch, chitin, or the like); and (4) 1.0 or 1.5 ml quantities of the third set or blend of organisms used to break down the organic compound(s) to smaller compounds/molecules. It is believed that the "starter" amount used for the blends of organisms can be varied widely to practice the new bioremediation composition as these will grow over time in use at a site. The ratio of the base or first bioremediation composition to the complex carbohydrate may also like be varied to provide a useful bioremediation composition with the given ratio of at least 1 to 2 being one useful example (e.g., with ratios of 1:1, 1:3, 1:4, and the like also considered within the breadth of this description). In brief, bench testing verified that the remediation composition was effective over an extended period of time in degrading the halogenated compounds (e.g., in degrading the COCs to target levels).

In one implementation, the first or base bioremediation composition used in the new bioremediation composition was a powdered activated carbon combined with a bioremediation technology (e.g., the first set or blend of organisms) cultured to exploit the conditions created by the composition. Degradation of contaminants takes place within the pore structure of the activated carbon and the initial condition is typically aerobic as wet activated carbon has an affinity for oxygen. In practice, the first or base bioremediation composition is essentially saturated with oxygen during the mixing process prior to injection into the contaminated formation of a site undergoing remediation. In the bench tests, steps were taken to eliminate oxygen so an anaerobic state would have been achieved very quickly once the bottles with the new bioremediation composition including this first or base bioremediation composition were prepared.

Building on the excellent results of the above-discussed bench tests/studies, the inventor performed another bench study involving decontamination or remediation of groundwater contaminated with gasoline. Particularly, the contaminants that were targeted for degradation with the new bioremediation composition included: 2-methylpropene; 2-methylbutane; 2-methylpentane; hexane; benzene; methylcyclohexane; toluene; ethylbenzene; m/p-xylene; o-xylene; 3-ethyltoluene; 1,2,4-trimethylbenzene; and naphthalene. The new bioremediation composition in this test utilized starch as part of the substrate for three different sets or blends of organisms (provided as the second or additive bioremediation composition) chosen to be included in the new bioremediation composition for their capability to degrade the above-listed contaminants (e.g., for this particular group of compounds).

The new bioremediation composition proved to have a time release quality (e.g., slower degrading of the complex carbohydrate in the form of starch into smaller molecules utilized by the different sets or blends of organisms as electron donors) with significant degradation continuing at least for 30 days. Also, significantly high levels of degradation were obtained across the spectrum of contaminants, and it is believed by the inventor that this successful decontamination is at least in part due to the combination of the two sets of microorganisms that degrade the halogenated compounds with other sets of organisms and activated carbon in the first or base bioremediation composition and a substrate using starch (along with another set of organisms chosen specifically to degrade the starch over an extended period of time).

Specifically, the overall degradation using the three different embodiments of the second or additive bioremediation composition (e.g., each differing in their blends of organisms to degrade the halogenated compounds) was 64.4 percent, 83.2 percent, and 86.1 percent or a range of about 64 percent to about 86 percent within 30 days. Some specific contaminants were degraded by up to about 98 percent after 30 days with the remediation compositions. These results are encouraging and show large improvements over the use of the same set or blend of organisms for degrading these contaminants with other more conventional substrates such as gypsum or sources of nitrogen dioxide or nitrate. Hence, it is believed by the inventor that the described embodiments of a new bioremediation composition, which combines the first or base composition (with activated carbon and a first blend of organisms suited for degrading hydrocarbons and other contaminants) with a second blend of organisms capable of degrading the contaminants along with a substrate of a starch or other complex carbohydrate and a third blend of organisms capable of degrading the complex carbohydrate, represents a useful and highly desirable improvement over prior remediation products.

To understand the desirability and usefulness of the presently described compositions, it may now be useful to more fully discuss biological degradation of halogenated compounds. In general, whenever you have the following conditions: Microorganisms+electron donors+electron acceptors+nutrients, biological activity will occur that can potentially degrade contaminants and promote growth. There are many reactions that can occur but they can be grouped into the following classifications: (a) use of the organic compound as a primary growth substrate; (b) growth promoting biological oxidation; (c) growth promoting biological reduction; (d) fermentation; and (e) cometabolism.

The first group classification or group includes pathways such as reductive dehalogenation and halorespiration. Fermentation is an important mechanism as this is one of the primary means for generation of hydrogen which is an important electron donor and takes part in numerous pathways resulting in replacement of hydrogen for chlorine on these halogenated compounds. In this process, chlorine atoms are displaced by hydrogen forming a host of daughter products. Common pathways shown in the literature for degradation of say TCE into a host of less chlorinated compounds like DCEs and VC are typically through reductive dechlorination. Fermentation may have a number of indicators. For example, generation of methane is strong evidence that fermentation is occurring as is generation of fatty acids. Aside from hydrogen and methane, a variety of fatty acids are produced by fermentation including acetate, formate, lactate, succinate, propionate, and butyrate. Once fatty acids are present, secondary fermentation may commence that consumes C3 and higher acids to yield additional acetate, formate, water, and hydrogen.

Cometabolism is a process by which the halogenated contaminant is degraded through enzymes and cofactors employed by the organism for metabolism of some other primary substrate (electron donor). Lactate is commonly used in this way for bioremediation of chlorinated solvents in concert with DHC and other organisms effective at degradation of such compounds. Many other materials have been employed for this purpose ranging from agricultural waste like corn cobs to crab and shrimp shells (chitin) to polymers like polylactates. Chitin is a material essentially insoluble in water but has been shown to be an effective material or composition for degradation of chlorinated solvents using one or more microorganisms.

There are a number of key features of bioremediation. Naturally occurring microorganisms are typically able to degrade a wide spectrum of contaminants. In many cases, metabolic byproducts are also toxic contaminants; however, these compounds are also susceptible to biodegradation. For the most part, microorganisms are fairly robust being able to thrive in a wide range of conditions including pH, temperature, and salinity (but, note, there are exceptions to this rule). Essential nutrients such as trace metals are often available from the mineral content of subsurface soils. Alternative compositions are often advantageous and are widely used to promote the degradation of contaminants of concern. One common composition used for this purpose is lactic acid.

There are, however, a number of limitations of bioremediation. Microorganisms often are unable to completely transform toxic contaminants into harmless byproducts. For example, some highly useful organisms convert TCE into vinyl chloride but are not able to degrade the vinyl chloride. As a result, other means are needed to deal with the vinyl chloride. One limitation of lactate is that it is water soluble such that it tends to move with groundwater and is rapidly consumed. As a result, supplemental doses of lactate are typically applied in practice to maintain a persistent concentration supportive of the degradation pathways. Other platforms or compositions such as vegetable oil or emulsified oils ferment slowly and a high percentage of this activity is not beneficially captured to degrade targeted contaminants. Some organisms are difficult to handle and sensitive to subsurface conditions such as pH. Since contaminants are often used as electron donors by the organisms (food source), as contaminant concentrations fall the microbial populations fall off and remedial progress stalls.

With all this in mind, the inventor has designed and fabricated a composition that is effective in combining biological degradation of a variety of contaminants including hydrocarbons and halogenated compounds. The composition may include activated carbon that concentrates the contaminants, which enables effective contact with a very active and large surface area. Nearly all of the absorption of organic compounds by the carbon will be within the microporous structure. Microorganisms will tend to inhabit the macro and meso-pore structure of the carbon as they are too large for access to the micro-pores.

One missing feature of this process has to do with whether absorbed compounds are bioavailable. In other words, it must be determined whether microorganisms residing within the macro and meso-pore structure of the carbon affect compounds stored within the microporous structure. Research performed by the inventor has produced definitive data proving that compounds absorbed by activated carbon are degraded by microorganisms residing in the larger pore network. When these two features are combined, the result is a highly effective and efficient system for degradation of organic compounds. Microorganisms secrete cofactors and enzymes that are able to penetrate into the microporous structure of the carbon, and the carbon platform provides the shuttle for transport of electrons to complete the reaction.

The inventor then understood that the last piece of the puzzle has to do with providing an effective time release mechanism to generate suitable low molecular weight compounds to support this process over time. Currently, materials that stem from low molecular weight fatty acids such as lactic acid or emulsified oils are utilized to facilitate bioremediation. However, neither of these or other materials in common use are well suited to support degradation over an extended period of time in an efficient manner. Simple addition of a complex carbohydrate or other organic compound is not enough as those microorganisms adept at degrading halogenated and other toxic compounds are not typically suited to the breakdown or fermentation of such materials. As a result, the process is slow at best and, in many cases, nonexistent.

The key identified by the inventor is to add one or more organisms whose main function is degradation of organic compounds or polymeric substances (e.g., complex carbohydrates such as starch and cellulosic materials). When this is done, the organic compounds or polymeric substances (e.g., complex carbohydrates such as food grade starch) begin to function as time release compositions because the large molecules are broken down into small pieces that are now directly usable for beneficial degradation of contaminants such as halogenated compounds. Although chitin was shown to perform in this system, it is virtually insoluble in water, and its structure is very much like cellulose. Cellulose is difficult to breakdown and was recently the focus of the biofuels industry and a concerted effort was put into fermenting this abundant material into ethanol. This proved to be more difficult than envisioned and chemical rather than biological means have been commercialized for production. The search for acceptable microorganisms continues and one of the more promising avenues involves looking for organisms in the feces of animals that eat cellulose such as the panda who survives mainly by consuming bamboo. Another limitation of chitin is that it is a byproduct of the fishing industry, being made from crab and shrimp shells. Fishing for these creatures is a seasonal activity and so the availability of chitin is not necessarily always dependable.

Among the many organic compounds tested, starch (e.g., corn or potato starch or other food grade starch) produced the best overall results. Food grade starch is readily available and inexpensive. Starch is slightly soluble in water and is readily fermented by a range of non-pathogenic organisms. For these reasons, starch is one preferred polysaccharide (or organic compound or polymeric substance) for use in the described system for bioremediation organisms. In general, many other complex carbohydrates may be used, and the complex carbohydrate may be a polymer with a formula of $C_m((H_2O)_n)$, wherein m and n are different integers and wherein m is greater than 6 such as greater than 12. Starch-containing materials such as corn cobs and potatoes may be utilized. However, all of these "starch containing" materials suffer from the fact that they consist primarily of cellulosic material and suffer from the associated limitations thereof. For purposes of this invention, such materials could be used; however, they likely will not be as effective as food grade starch. It is expected that this system can be applied to a wide range of site conditions and was specifically developed to target source area impacts. Further, although not considered examples of complex carbohydrates, oligosaccharides (such as raffinose and stachyose, which are found in beans, cabbage, and the like) may be used along with or, in some cases, in place of one or more complex carbohydrates.

Representative examples of organisms (or microorganisms that may be used to provide a second bioremediation material as called out in the following claims) that degrade halogenated compounds fall into several metabolic groups including (but not limited to): halorespirators; acetogens; methanogens; and facultative anaerobes. Examples of halorespirators include Dehalococcoides strains (SiRem of Canada offers a consortia of these called KB-1), *Dehalobacter restrictus*, and *Deesulfitobacterium dehalogenans*. Examples of acetogens include *Clostridium aceticum* and *Bacillus acetogens*. Examples of methanogens include *Methanobacterium bryantii, Methanococcus deltae, Methanogenium cariaci*, and *Methanosarcina acetivorans*. Also, many methanogens are found among the *Archea* (e.g., there are over 50 described species). Examples of facultative anaerobes include bacterial and fungal genera such as *Actinomyces, Bacteroides, Clostridium, Porphyromonas,* and *Veillonella* species. Of course, one skilled in the art will readily understand that the above examples are a few of many microorganisms that are known and may be included singly or in combination in the first bioremediation material.

As discussed above, there are many types of starch (or food grade starch) with sources such as potato, corn, maize, rice, tapioca, wheat, soy bean, and plants (or plant products). Likewise, a variety of organisms may be used alone or in combination in the second bioremediation material (as called out in the claims) to provide useful degradation of such starches. Two common breakdown products of the biological degradation of starch are maltose and glucose. Examples of bacteria that may be provided in the second bioremediation material include: *Bacillus amyloliquefacicns, Bacillus licheniformis, Bacillus subtilis,* and *Pseudomonas* spp. Further, examples of fungi that may be provided in the second bioremediation material include: *Aspergillus niger* and *Penicillium.*

The foregoing description is considered as illustrative only of the principles of the compositions and methods described and later claimed. The words "comprise," "comprising," "include," "including," and "includes" when used in this specification and in the following claims are intended to specify the presence of one or more stated features, integers, components, or steps, but they do not preclude the presence or addition of one or more other features, integers, components, steps, or groups thereof. Furthermore, since a number of modifications and changes will readily occur to those skilled in the art, it is not desired to limit the invention to the exact construction and process shown described above. Accordingly, all suitable modifications and equivalents may be resorted to falling within the scope of the invention as defined by the claims that follow.

I claim:

1. A composition for remediation of soil, sludge, wastewater, or groundwater containing contaminants including hydrocarbons and halogenated compounds, comprising:
    a first bioremediation material comprising at least one organism capable of degrading a first contaminant;
    a second bioremediation material comprising at least one organism capable of degrading a second contaminant; and
    a time release substrate combined with the first and second bioremediation materials, comprising:
        an organic compound; and
        a third bioremediation material, mixed with the organic compound, comprising at least one organism capable of degrading the organic compound for use by the organisms of at least one of the first and second bioremediation materials during the degrading of the first and second contaminants, wherein the degrading of the organic compound by the organisms of the third bioremediation material is performed over a time period of at least 20 days.

2. The composition of claim 1, wherein the first contaminant includes a hydrocarbon and the second contaminant includes a halogenated compound.

3. The composition of claim 1, wherein the organic compound comprises a complex carbohydrate.

4. The composition of claim 3, wherein the complex carbohydrate comprises starch.

5. The composition of claim 3, wherein the complex carbohydrate comprises chitin.

6. The composition of claim 1, wherein degrading of the organic compound by the organisms of the third bioremediation material comprises breaking the organic compound into a plurality of smaller molecules utilized by the organisms of at least one of the first and second bioremediation materials during the degrading of the first and second contaminants.

7. The composition of claim 1, wherein the first remediation material comprises activated carbon capable of adsorbing the first and second contaminants.

8. The composition of claim 7, wherein the activated carbon has a surface area between about 800 and 2000 $m^2/g$.

9. The composition of claim 1, wherein the first bioremediation material further comprises an adsorbent capable of adsorbing hydrocarbons and a compound that releases sulfate over a period of time and wherein the first bioremediation material comprises a nutrient system for promoting growth of microorganisms capable of metabolizing the adsorbed hydrocarbons.

10. The composition of claim 9, wherein the adsorbent comprises activated carbon and wherein the sulfate-containing compound comprises calcium sulfate.

11. The composition of claim 9, wherein the nutrient system includes a sulfide scavenging agent.

12. The composition of claim 11, wherein the sulfide scavenging agent comprises iron sulfate.

13. The composition of claim 9, wherein the nutrient system includes a nitrogen source and a phosphorous source.

14. The composition of claim 13, wherein the nitrogen source comprises an ammonium salt and the phosphorous source comprises a monobasic alkali-metal phosphate.

15. The composition of claim 13, wherein the nitrogen source comprises ammonia and ammonium nitrate in a molar ratio of about 2.3 to 1.

16. A composition for remediation of soil, sludge, wastewater, or groundwater containing contaminants including hydrocarbons and halogenated compounds, comprising:
    a first bioremediation material comprising at least one organism capable of degrading a first contaminant;
    a second bioremediation material comprising at least one organism capable of degrading a second contaminant; and
    a time release substrate comprising:
        an organic compound; and
        a third bioremediation material comprising at least one organism capable of degrading the organic compound into smaller molecules for use by the organisms of at least one of the first and second bioremediation materials during the degrading of the first and second contaminants,
    wherein the first contaminant includes a hydrocarbon and the second contaminant includes a halogenated compound,
    wherein the first remediation material comprises activated carbon capable of adsorbing at least one of the first and second contaminants, and
    wherein the hydrocarbon is an electron acceptor during the degrading of the first contaminant with the activated carbon acting as an electrical conductor.

17. The composition of claim 16, wherein the organic compound comprises a complex carbohydrate.

18. The composition of claim 17, wherein the complex carbohydrate comprises starch.

19. The composition of claim 17, wherein the complex carbohydrate comprises chitin.

20. The composition of claim 16, wherein the smaller molecules are utilized by the organisms of at least one of the first and second bioremediation materials during the degrading of the first and second contaminants.

21. The composition of claim 16, wherein the degrading of the organic compound by the organisms of the third bioremediation material is performed over a time period of at least 20 days.

22. The composition of claim 16, wherein the activated carbon has a surface area between about 800 and 2000 $m^2/g$.

23. The composition of claim 16, wherein the first bioremediation material further comprises an adsorbent capable of adsorbing hydrocarbons and a compound that releases sulfate over a period of time and wherein the first bioremediation material comprises a nutrient system for promoting growth of microorganisms capable of metabolizing the adsorbed hydrocarbons.

24. The composition of claim 23, wherein the sulfate-containing compound comprises calcium sulfate.

25. The composition of claim 23, wherein the nutrient system includes a sulfide scavenging agent.

26. The composition of claim 25, wherein the sulfide scavenging agent comprises iron sulfate.

27. The composition of claim 23, wherein the nutrient system includes a nitrogen source and a phosphorous source.

28. The composition of claim 27, wherein the nitrogen source comprises an ammonium salt and the phosphorous source comprises a monobasic alkali-metal phosphate.

29. A composition for remediation of soil, sludge, wastewater, or groundwater containing contaminants including hydrocarbons and halogenated compounds, comprising:
a first bioremediation material comprising at least one organism capable of degrading a first contaminant;
a second bioremediation material comprising at least one organism capable of degrading a second contaminant;
a time release substrate comprising:
an organic compound comprising a complex carbohydrate; and
a third bioremediation material, mixed with the organic compound, comprising at least one organism capable of degrading the organic compound for use by the organisms of at least one of the first and second bioremediation materials during the degrading of the first and second contaminants,
wherein degrading of the organic compound by the organisms of the third bioremediation material comprises breaking the organic compound into a plurality of smaller molecules utilized by the organisms of at least one of the first and second bioremediation materials during the degrading of the first and second contaminants and wherein the degrading of the organic compound by the organisms of the third bioremediation material is performed over a time period of at least 20 days.

30. The composition of claim 29, wherein the complex carbohydrate comprises at least one of starch and chitin.

31. The composition of claim 29, wherein the first bioremediation material comprises activated carbon capable of adsorbing the first and second contaminants and wherein the activated carbon has a surface area between about 800 and 2000 $m^2/g$.

32. The composition of claim 29, wherein the first bioremediation material further comprises an adsorbent capable of adsorbing hydrocarbons and a compound that releases sulfate over a period of time and wherein the first bioremediation material comprises a nutrient system for promoting growth of microorganisms capable of metabolizing the adsorbed hydrocarbons.

33. The composition of claim 32, wherein the adsorbent comprises activated carbon.

34. The composition of claim 32, wherein the compound that releases sulfate comprises calcium sulfate.

35. The composition of claim 32, wherein the nutrient system includes at least one of a sulfide scavenging agent, a nitrogen source, and a phosphorous source.

* * * * *